(12) United States Patent
Nakamura

(10) Patent No.: US 9,476,479 B2
(45) Date of Patent: Oct. 25, 2016

(54) TUBULAR VIBRATION-DAMPING DEVICE USED FOR VIBRATION-DAMPING CONNECTING ROD, VIBRATION-DAMPING CONNECTING ROD USING THE SAME, AND METHOD OF MANUFACTURING VIBRATION-DAMPING CONNECTING ROD

(71) Applicant: SUMITOMO RIKO COMPANY LIMITED, Komaki-shi, Aichi (JP)

(72) Inventor: Satoki Nakamura, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/929,935

(22) Filed: Nov. 2, 2015

(65) Prior Publication Data
US 2016/0053848 A1   Feb. 25, 2016

Related U.S. Application Data

(63) Continuation of application No. PCT/JP2014/059237, filed on Mar. 28, 2014.

(51) Int. Cl.
*F16F 5/00*    (2006.01)
*F16F 15/08*   (2006.01)
*F16F 1/38*    (2006.01)

(52) U.S. Cl.
CPC ............. *F16F 15/08* (2013.01); *F16F 1/3842* (2013.01); *F16F 1/3863* (2013.01); *F16F 2226/04* (2013.01)

(58) Field of Classification Search
CPC ...... F16F 15/08; F16F 1/3863; F16F 1/3842; F16F 2226/04

USPC ............ 248/634; 267/140.12, 140.13, 140.3, 267/140.4, 136; 29/896.93
See application file for complete search history.

(56) References Cited

U.S. PATENT DOCUMENTS 4,706,946 A  *  11/1987  Thorn ................... B60K 5/1241
                                              248/636
7,293,755 B2 *  11/2007  Miyahara ................ F16F 13/16
                                              248/560

(Continued)

FOREIGN PATENT DOCUMENTS

EP    1247678 A2   10/2002
EP    2105629 A1   9/2009

(Continued)

*Primary Examiner* — Todd M Epps
(74) *Attorney, Agent, or Firm* — Oliff PLC

(57) ABSTRACT

Provided are a tubular vibration-damping device for a vibration-damping connecting rod, a vibration-damping connecting rod using the same and a method of manufacturing the vibration-damping connecting rod. The device including an inner shaft member and an outer tubular member being connected by a main rubber elastic body, the inner shaft member having a structure wherein first and second connecting members are inserted into a sleeve member bonded to the main rubber elastic body, the connecting members being axially overlapped with and spaced from each other to provide a rod-end insertion space communicated with outside via rod insertion holes that open through peripheral walls of the sleeve member and the outer tubular member, one end of a rod main body being inserted via the rod insertion holes into the rod-end insertion space and fixed to the first and second connecting members by a fastening member.

9 Claims, 8 Drawing Sheets

(56) References Cited

U.S. PATENT DOCUMENTS

| | | | |
|---|---|---|---|
| 8,967,599 B2* | 3/2015 | Yoneyama | B29C 45/14344 267/141.1 |
| 9,242,542 B2* | 1/2016 | Loeffelsender | B60K 5/1241 |
| 9,347,517 B2* | 5/2016 | Yokawa | F16F 1/3849 |
| 2007/0018367 A1* | 1/2007 | Kamei | F16F 1/3863 267/140.12 |
| 2010/0140856 A1* | 6/2010 | Endo | F16F 13/14 267/140.12 |
| 2015/0129742 A1* | 5/2015 | Okanaka | B60K 5/1208 248/634 |

FOREIGN PATENT DOCUMENTS

| | | |
|---|---|---|
| JP | 2006002908 A | 1/2006 |
| JP | 2006250234 A | 9/2006 |

* cited by examiner

TUBULAR VIBRATION-DAMPING DEVICE
USED FOR VIBRATION-DAMPING
CONNECTING ROD, VIBRATION-DAMPING
CONNECTING ROD USING THE SAME, AND
METHOD OF MANUFACTURING
VIBRATION-DAMPING CONNECTING ROD

INCORPORATED BY REFERENCE

This is a Continuation of International Application No. PCT/JP2014/059237 filed on Mar. 28, 2014, the disclosure of which including the specification, drawings and abstract is incorporated herein by reference in its entirety.

BACKGROUND OF THE INVENTION

1. Field of the Invention

The present invention relates to a tubular vibration-damping device used for a vibration-damping connecting rod such as a torque rod, and to a vibration-damping connecting rod using the same, and further to a manufacturing method thereof.

2. Description of the Related Art

A vibration-damping connecting rod has been known as a unit utilized as a torque rod that supports torque reaction force of a power unit, and the like. This vibration-damping connecting rod includes a rod main body and a tubular vibration-damping device provided at least at one end of the rod main body. The tubular vibration-damping device has a structure such that an inner shaft member is inserted into an outer tubular member, while the inner shaft member and the outer tubular member are elastically connected to each other by a main rubber elastic body. For example, the vehicular-side torque rod bush described in Japanese Unexamined Patent Publication No. JP-A-2006-002908 is such a one.

As shown in JP-A-2006-002908, the rod main body of the torque rod, which is fixed to the power unit side as a vibration source, is generally mounted to the outer tubular member of the tubular vibration-damping device of the torque rod.

In order to set a broader linear region of the vibration characteristics, the amount of displacement of the outer tubular member relative to the inner shaft member needs to be well allowed. Therefore, once the outer tubular member is mounted to the power unit side, a large space is required around the outer tubular member on the vehicular body side as a vibration-damping target member. In addition, the displacement of the outer tubular member relative to vehicular body tends to cause a problem of interference between the outer tubular member and other members mounted to the vehicular body.

To address this problem, European Unexamined Patent Publication No. EP 2 105 629 discloses that the outer tubular member is pressed into a holder such as a suspension member or the like and mounted to the vehicular body. According to the structure disclosed by EP 2 105 629, two tubular vibration-damping devices are overlapped with each other in the axial direction, while the rod main body is inserted into a concave portion provided in the overlapping portion of the inner shaft member via a cutout provided in the overlapping portion of the outer tubular member so as to be fixed to the inner shaft member.

However, since the main rubber elastic body is divided into two sections according to the structure of EP 2 105 629, the rubber volume of each main rubber elastic body is reduced to lower the degree of tuning freedom of vibration-damping characteristics and the durability thereof. In addition, since the inner shaft member supporting the rod main body is directly bonded to the main rubber elastic body, when the inner shaft member of each tubular vibration-damping device is brought closer to each other to hold the rod main body in between, the elasticity of the main rubber elastic body works to prevent such displacement of getting closer to each other, possibly causing difficulty in assembling the rod main body.

SUMMARY OF THE INVENTION

The present invention has been developed in view of the above-described matters as the background, and it is an object of the present invention to provide a tubular vibration-damping device for a vibration-damping connecting rod with a novel structure capable of securing the degree of tuning freedom of vibration-damping characteristics and the durability thereof and being mounted easily to the rod main body, while adopting a structure where the rod main body can be mounted to the inner shaft member.

Also, the present invention is aiming at providing a vibration-damping connecting rod using the tubular vibration-damping device described above and a manufacturing method thereof.

The above and/or optional objects of this invention may be attained according to at least one of the following aspects of the invention. The following aspects and/or elements employed in each aspect of the invention may be adopted at any possible optional combinations.

A first aspect of the present invention provides a tubular vibration-damping device for a vibration-damping connecting rod having a rod main body, comprising: an inner shaft member configured to be mounted on the rod main body; an outer tubular member; and a main rubber elastic body elastically connecting the inner shaft member and the outer tubular member, wherein the inner shaft member comprises a sleeve member, a first connecting member and a second connecting member, the first and second connecting members being overlapped with each other in an axial direction and being inserted into the sleeve member, the main rubber elastic body is bonded to an outer peripheral face of the sleeve member, overlapping faces of the first and second connecting members in the axial direction are separated from each other so as to provide therebetween a rod-end insertion space, the rod-end insertion space is communicated with an outside via a rod insertion hole that opens through peripheral walls of the sleeve member and the outer tubular member, and the first and second connecting members are configured to be fixed on one end of the rod main body inserted into the rod-end insertion space via the rod insertion hole by a fastening member so that the first and second connecting members are abutted on the rod main body by the fastening member.

According to the tubular vibration-damping device for the vibration-damping connecting rod with the structure of the first aspect, the inner shaft member is structured such that the first connecting member and the second connecting member are inserted into the sleeve member, and the sleeve member and the outer tubular member are elastically connected by the main rubber elastic body. This makes it possible to obtain a large rubber volume of the main rubber elastic body in the axis direction, and to thereby achieve an improved degree of tuning freedom of the vibration-damping characteristics and an enhanced durability of the main rubber elastic body.

Further, there is no need to divide the outer tubular member in the axial direction, and the dimension of the outer tubular member in the axial direction is set large, while the press-fitting face of the outer tubular member against the mounting object member can be secured large enough. This makes it possible to enhance the anti-slipoff force against the mounting object member and to stabilize a mounting condition.

Also, the first and second connecting members are configured to be abutted on one end of the rod main body inserted into the rod-end insertion space, so that the inner shaft member can be mounted to the rod main body without any rattling. Further, by bringing the first connecting member and the second connecting member that are inserted into the sleeve member closer to each other by the fastening force of the fastening member, the rod main body can be held between the first connecting member and the second connecting member without adding any particularly strong force. In addition, since the first connecting member and the second connecting member are inserted into the sleeve member without being bonded to the main rubber elastic body, the displacement of the first connecting member and the second connecting member to get closer to each other is not inhibited by the elasticity of the main rubber elastic body, making it easier to mount the same to the rod main body.

A second aspect of the present invention provides the tubular vibration-damping device for the vibration-damping connecting rod according to the first aspect, wherein at least one of the first and second connecting members is provided with a fitting portion for being engaged with the rod main body in a concave-convex manner.

According to the second aspect, by having the fitting portion provided in at least one of the first and second connecting members fitted with the rod main body in a concave-convex manner, the rod main body is positioned at a given location relative to the inner shaft member. With the rod main body being mounted to the tubular vibration-damping device, the rod main body is prevented from slipping out of the rod-end insertion space and the like by having the fitting portion locked against the rod main body in the axis-perpendicular direction, A third aspect of the present invention provides the tubular vibration-damping device for the vibration-damping connecting rod described according to the first or second aspect, wherein at least one of the first and second connecting members is provided with an insertion-position regulating part that regulates a position of an insertion end relative to the sleeve member.

According to the third aspect, at least one of the first and second connecting members is inserted into the sleeve member up to a given position regulated by the insertion-position regulating part, whereby the rod-end insertion space is fixed at a proper position in the axial direction of the inner shaft member.

A fourth aspect of the present invention provides the tubular vibration-damping device for the vibration-damping connecting rod according to any one of the first to third aspects, wherein at least one of the first and second connecting members is provided with a rod-position regulating part that regulates a position of an insertion end of the rod main body relative to the rod-end insertion space.

According to the fourth aspect, by properly setting the amount of insertion of the rod main body into the rod-end insertion space, the rod main body and the first and second connecting members can be fixed by the fastening member at a right position.

A fifth aspect of the present invention provides the tubular vibration-damping device for the vibration-damping connecting rod according to any one of the first to fourth aspects, wherein one of the first and second connecting members is provided with a nut integrally, while the fastening member comprises the nut and a fixing bolt configured to be inserted into a bolt hole that penetrates an other of the first and second connecting members and the rod main body, and by having the fixing bolt screwed into the nut, the first and second connecting members and the rod main body are fixed to each other, with the first and second connecting members being abutted on the rod main body by tightening the fixing bolt with said nut.

According to the fifth aspect of the present invention, the first and second connecting members and the rod main body can easily be fixed by screwing the fixing bolt into the nut. Also, the first and second connecting members can be displaced in the direction of getting closer to each other to be abutted on the rod main body by the fastening force of the fixing bolt and the nut. Further, by adjusting the tightening of the fixing bolt in the nut, the abutting force of the first and second connecting members on the rod main body can easily be adjusted.

A sixth aspect of the present invention provides a vibration-damping connecting rod, comprising: a rod main body; and a tubular vibration-damping device according to any one of the first to fifth aspects, wherein the one end of the rod main body is inserted into the rod-end insertion space via the rod insertion hole, and is fixed between the overlapping faces of the first and second connecting members.

According to the vibration-damping connecting rod according to the sixth aspect, excellent vibration-damping performance and durability can be achieved by providing the tubular vibration-damping device for a vibration-damping connecting rod related to the present invention.

In addition, since one end of the rod main body is held between the first and second commenting members of the inner shaft member to be fixed thereto, the weight of the rod main body can be made lighter than that of the conventional structure where the rod main body includes at its one end a press-fit portion of the outer tubular member. This makes it easier to set a resonance frequency higher of the resonance system consisting of the mass of the rod main body, thereby reducing or avoiding any adverse effect by the resonance of the rod main body on the vibration condition, while obtaining the intended vibration-damping characteristics.

A seventh aspect of the present invention provides a method of manufacturing a vibration-damping connecting rod comprising: a rubber molding step for vulcanization-molding a main rubber elastic body between a sleeve member and an outer tubular member for elastically connecting the sleeve member and the outer tubular member by the main rubber elastic body; an inner temporary assembly step for inserting a first connecting member and a second connecting member into the sleeve member to be overlapped with each other in an axial direction, and for assembling at least one of the first and second connecting members to the sleeve member in a movable manner in the axial direction; a rod insertion step for inserting one end of a rod main body into a rod-end insertion space formed between the overlapping faces in the axial direction of the first and second connecting members via a rod insertion hole formed on peripheral walls of the sleeve member and the outer tubular member; and a rod fixing step for fixing the first and second connecting members to the one end of the rod main body by a fastening member with at least one of the first and second connecting members being moved in the axial direction relative to the sleeve member by a fastening force of the fastening member so that the first and second connecting members are abutted on the rod main body.

According to the manufacturing method of the vibration-damping connecting rod according to the seventh aspect, the distance between the first and second communicating members in the axial direction is made larger than the thickness of the rod main body in the same direction at the time of insertion of the rod main body into the rod-end insertion space, so that the rod main body can easily be inserted with a small force.

In addition, when the first and second connecting members are fixed to the rod main body by the fastening member, the first and second connecting members are displaced to get closer to each other by the fastening force of the fastening member to be abutted respectively on the rod main body, owing to the structure that at least one of the first and second connecting members are assembled to the sleeve member in a movable manner in the axial direction. Therefore, once the rod main body is fixed by the fastening member, the rod main body is mounted to the first and second connecting members without any rattling or the like.

An eighth aspect of the present invention provides the manufacturing method of the vibration-damping connecting rod according to the seventh aspect, wherein in the inner temporarily assembly step, a distance between the overlapping faces of the first and second connecting members is made larger than a size of the one end of the rod main body, in the rod insertion step, the one end of the rod main body is inserted into the rod-end insertion space with a gap left against at least one of the overlapping faces of the first and second connecting members, and in the rod fixing step, the first and second connecting members are displaced to get closer to each other so as to be abutted on the rod main body.

According to the eighth aspect, since the rod-end insertion space is expanded in advance in a larger size than the one end of the rod main body, the insertion of the rod main body into the rod-end insertion space can be performed with a smaller force.

A ninth aspect of the present invention provides the manufacturing method of the vibration-damping connecting rod according to the seventh aspect, wherein in the rod insertion step, the one end of the rod main body is inserted into the rod-end insertion space while at least one of the first and second connecting members is moved outward in the axial direction of the sleeve member by a component force generated upon insertion of the one end of the rod main body into the rod-end insertion space.

According to the ninth aspect, the amount of insertion of the first and second connecting members into the sleeve member is set large enough to prevent them from slipping out of the sleeve member in the step of inner temporary assembly. This makes it easier to handle the tubular vibration-damping device for a vibration-damping connecting rod during its manufacturing step, while makes it easier, for example, to store or transport the tubular vibration-damping device for a vibration-damping connecting rod in a single unit before the assembly to the main body.

According to the present invention, the inner shaft member is structured such that the first and second connecting members are inserted into the sleeve member while the sleeve member and the outer tubular member are elastically connected by the main rubber elastic body. Therefore, the rubber volume of the main rubber elastic body is secured large enough in the axial direction to improve the degree of tuning freedom of the vibration-damping characteristics and to enhance the durability of the main rubber elastic body. Further, the first and second connecting members inserted into the sleeve member are abutted on the rod main body that is inserted into the rod-end insertion space, so that any rattling of the rod main body against the inner shaft member is prevented. Moreover, since the first and second connecting members are inserted into the sleeve member without being bonded to the main rubber elastic body, abutting of the first and second connecting members on the rod main body is not inhibited by the elasticity of the main rubber elastic body, making it easier to mount the same to the rod main body.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Embodiments of the present invention will be described below in reference to the drawings.

Figure 1:
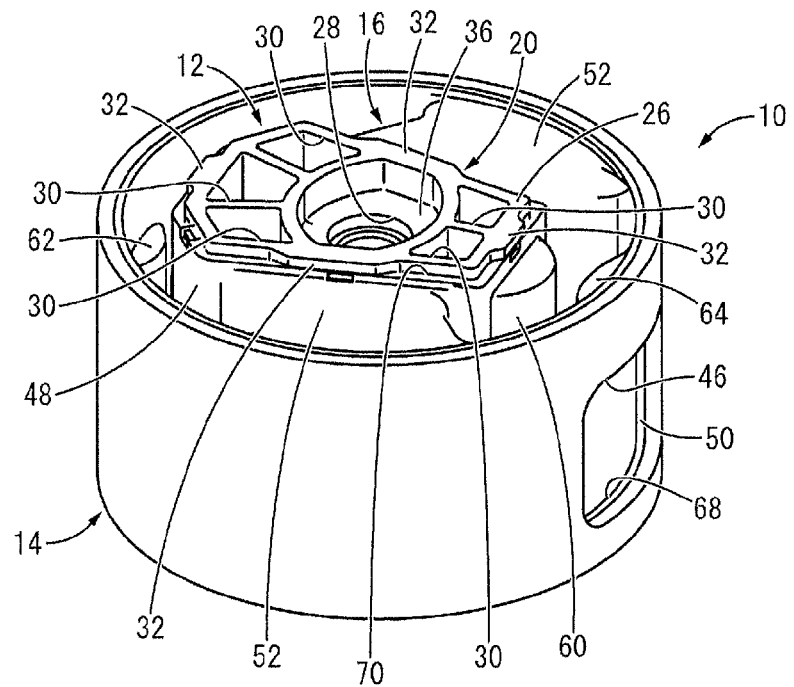
FIG. 1 is a perspective view of a tubular vibration-damping device as a first embodiment of the present invention.
Figure 2:
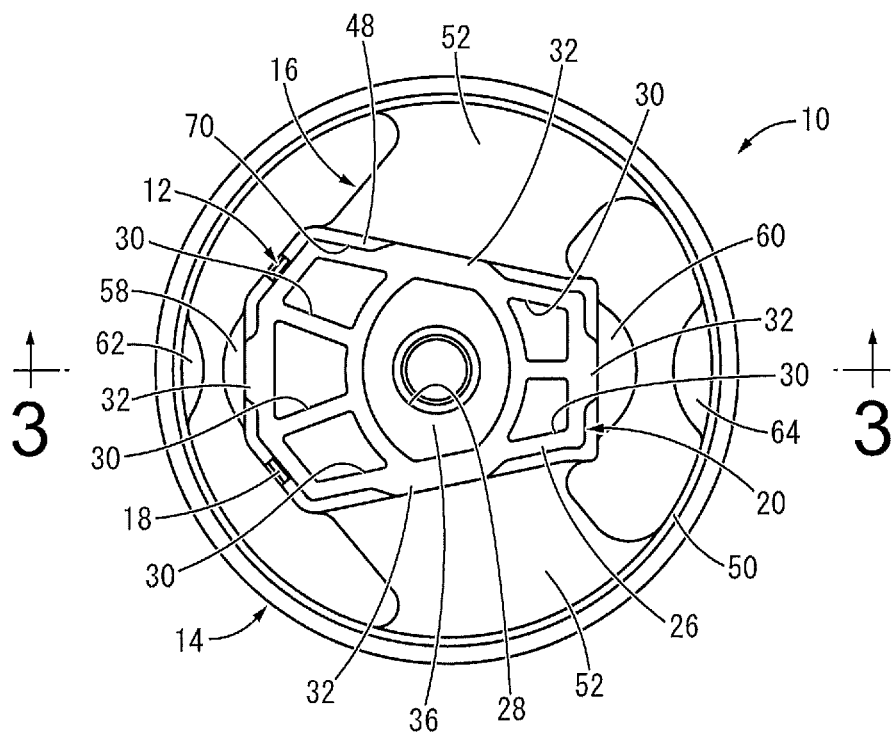
FIG. 2 is a plan view of the tubular vibration-damping device of FIG. 1.
Figure 3:
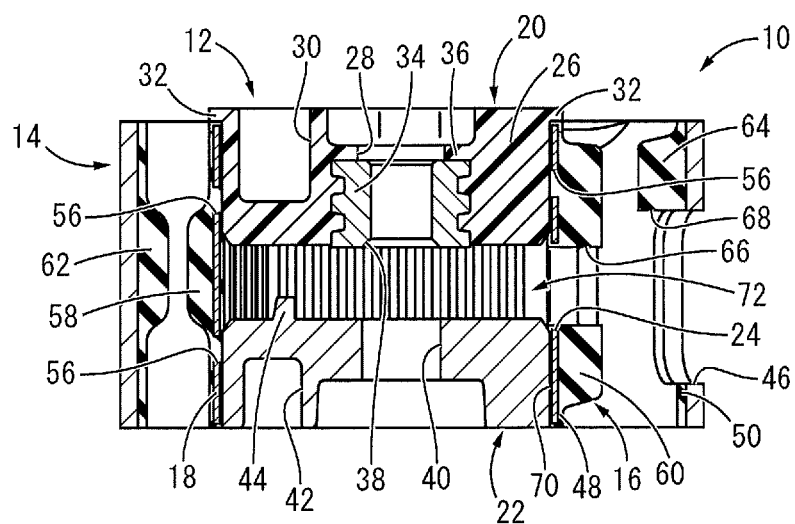
FIG. 3 is a cross sectional view taken along line 3-3 of FIG. 2.

FIGS. 1 to 3 show a tubular vibration-damping device 10 for a vibration-damping connecting rod (hereinafter called "tubular vibration-damping device") as a first embodiment of the present invention. The tubular vibration-damping device 10 has a structure where an inner shaft member 12 and an outer tubular member 14 are elastically connected by a main rubber elastic body 16. In the following descriptions, the up-down direction means the up-down direction in FIG. 3, unless otherwise noted. Also, the front-back direction means the left-right direction in FIG. 2, which is the vehicle's front-back direction under a condition of the device being mounted onboard, while the left-right direction means the up-down direction in FIG. 2, which is the vehicle's left-right direction.

More specifically, the inner shaft member 12 has a structure where a first connecting member 20 and a second connecting member 22 are inserted into a sleeve member 18 from the upper opening and the lower opening, respectively.

The sleeve member 18 is a high rigidity member formed with metal such as iron or aluminum alloy in an approximate shape of a thin polygonal cylinder in the present embodiment. Also, in part of the peripheral wall of the sleeve member 18, an inner window 24 is formed as a rod insertion hole penetrating through the middle portion thereof in the axial direction.

The first connecting member 20 has a main body portion 26 formed with resin. The main body portion 26 is in an approximate shape of a polygonal prism with the outer peripheral configuration roughly corresponding to the inner peripheral configuration of the sleeve member 18 where a through hole 28 is formed penetrating therethrough in the up-down direction in the middle portion. Further, in the main body portion 26, a plurality of lightening concaves 30 are formed opening upward to reduce the weight. Also, on the top end of the main body portion 26, sleeve abutting protrusion 32 as insertion-position regulating parts are integrally formed protruding peripherally outward at multiple locations along the circumference. The bottom end of the outer peripheral face of the main body portion 26 is made in a tapered form that gradually reduces in size downward.

In addition, a nut 34 is integrally bonded to the main body portion 26. The nut 34 is arranged in the lower end portion of a through hole 28 with its top face overlapped with and fixed to an inner flange portion 36 formed in the middle of the through hole 28 and with its outer peripheral face fixed to the inner peripheral face of the through hole 28. Also, the bottom face of the nut 34 protrudes slightly downward beyond the bottom face of the main body portion 26, while at the inner peripheral portion at the bottom of the nut 34, an engaging concave portion 38 is formed in a tapered form with the diameter increasing downward. Further, concave and convex portions are provided alternately in the axial direction along the outer peripheral face of the nut 34, thereby the bonding area with the main body portion 26 is made large enough, while the nut 34 is prevented from slipping out of the main body portion 26 by engagement therewith. The nut 34 is inserted in place at the time of molding the main body portion 26.

The second connecting member 22 is formed with metal such as iron or aluminum alloy in an approximate shape of a polygonal prism with the outer peripheral configuration roughly corresponding to the inner peripheral configuration of the sleeve member 18, as is the case with the first connecting member 20. In addition, in the middle of the second connecting member 22, a bolt hole 40 is formed penetrating therethrough in the up-down direction. Further, a plurality of lightening concaves 42 are formed opening to the bottom face in the second connecting member 22 to reduce the weight. Moreover, a rod abutting protrusion 44 as a rod-position regulating part is integrally formed with the second connecting member 22 protruding upward. Also, the top end of the other peripheral face of the second connecting member 22 is made in a tapered form that gradually reduces in size upward.

Meanwhile, the outer tubular member 14 is a high rigidity member formed with metal or the like in an approximate shape of a thin and large-diameter cylinder. Also, an outer window 46 is formed as a rod insertion hole penetrating through a part of the peripheral wall of the outer tubular member 14.

Figure 4:
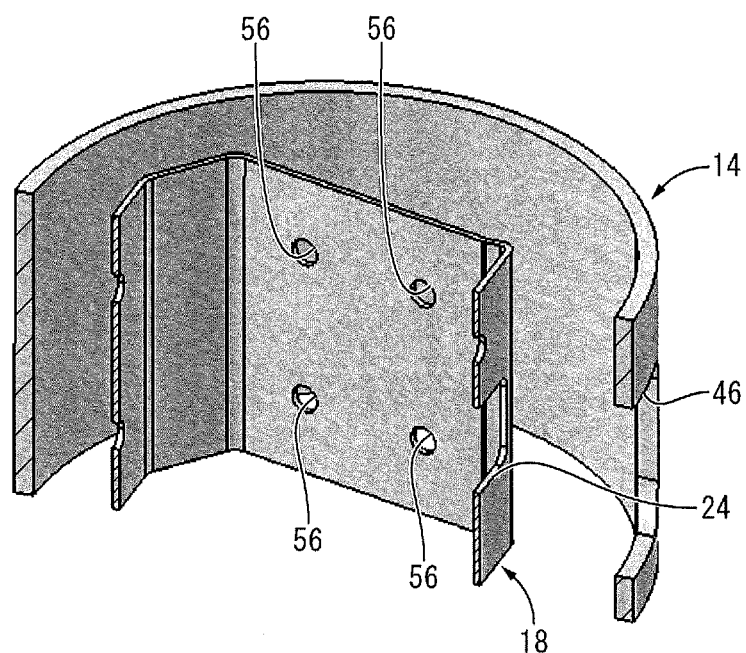
FIG. 4 is a perspective cross sectional view of an outer tubular member and a sleeve member of the tubular vibration-damping device of FIG. 1.
Figure 5:
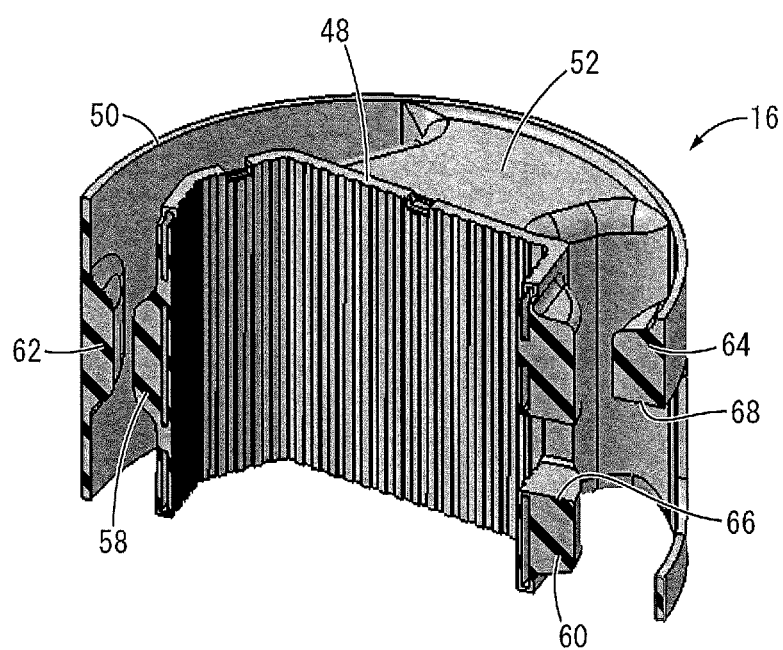
FIG. 5 is a perspective cross sectional view of a main rubber elastic body of the tubular vibration-damping device of FIG. 1.

Then, the sleeve member 18 of the inner shaft member 12 is arranged inserted into the inner peripheral side of the outer tubular member 14 at a given distance therefrom (see FIG. 4), and the sleeve member 18 and the outer tubular member 14 are elastically connected by the main rubber elastic body 16. As shown in FIG. 5, the main rubber elastic body 16 is integrally provided with an inner rubber layer 48 that covers the surface of the sleeve member 18, an outer rubber layer 50 that covers the inner peripheral face of the outer tubular member 14, and a pair of left and right connective arms 52, 52 that connect the inner rubber layer 48 and the outer rubber layer 50 to each other. This allows the inner peripheral side end of the connective arm 52 to be vulcanization-adhered to the outer peripheral face of the sleeve member 18 in the inner rubber layer 48 and the outer peripheral side end of the connective arm 52 to be vulcanization-adhered to the inner peripheral face of the outer tubular member 14 in the outer rubber layer 50. The main rubber elastic body 16 is formed as an integrally vulcanization molded component 54 provided with the sleeve member 18 and the outer tubular member 14. Also, in the present embodiment, a plurality of communication holes 56 are formed on the peripheral wall of the sleeve member 18 so that the prescribed inner rubber layer 48 is formed on the inner and outer peripheral faces of the sleeve member 18 without generating short shot of rubber material, while the bonding strength of the inner rubber layer 48 to the sleeve member 18 is improved.

Further, the inner rubber layer 48 is provided with a first inner rubber stopper 58 and a second inner rubber stopper 60 protruding outward from the front and rear sides, respectively. Meanwhile, the outer rubber layer 50 is provided with a first outer rubber stopper 62 and a second outer rubber stopper 64 protruding inward from the front and rear sides, respectively. Moreover, the first inner rubber stopper 58 and the first outer rubber stopper 62 are facing each other at a given distance in the front-back direction, while the second inner rubber stopper 60 and the second outer rubber stopper 64 are facing each other at a given distance in the same direction. Thus a front-back stopper means is formed to regulate the relative displacement between the inner shaft member 12 and the outer tubular member 14 in the front-back direction by having the sleeve member 18 and the outer tubular member 14 abutted against each other via the first rubber stoppers 58, 62 or the second rubber stoppers 60, 64 in the vibration input in the front-back direction.

In the inner rubber layer 48 including the second inner rubber stopper 60, an inner through window 66 is formed at a position corresponding to the inner window 24 of the sleeve member 18. Similarly, in the outer rubber layer 50, an outer through window 68 is formed at a position corresponding to the outer window 46 of the outer tubular member 14. The inner window 24 of the sleeve member 18 and the outer window 46 of the outer tubular member 14 are positioned against each other on the circumference, each opening in the vehicle's front-back direction.

Figure 6:
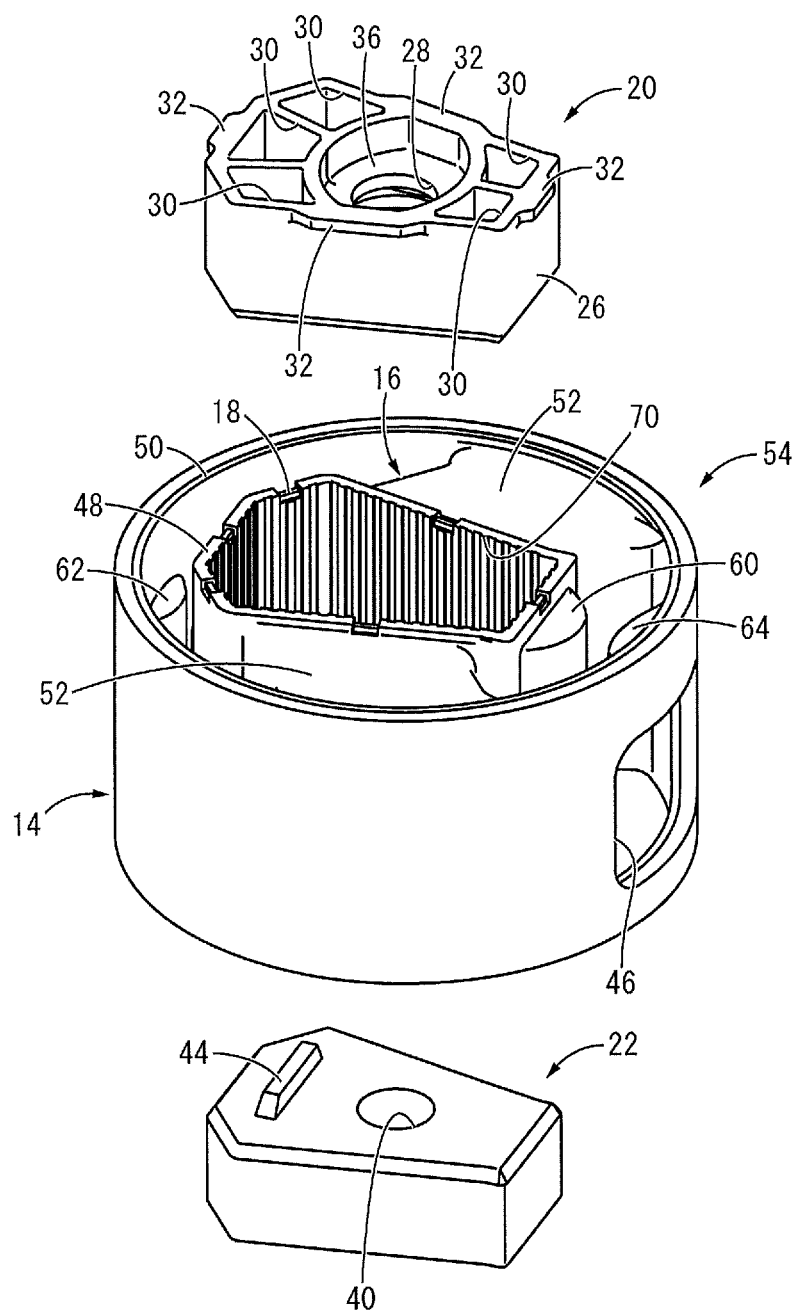
FIG. 6 is an exploded perspective view of the tubular vibration-damping device of FIG. 1.

Then, as shown in FIG. 6, by having the first connecting member 20 and the second connecting member 22 overlapped with each other in the axial direction to be inserted into the sleeve member 18 constituting an integrally vulcanization molded component 54 of the main rubber elastic body 16, the tubular vibration-damping device 10 of the present embodiment (see FIG. 3) is configured.

That is, the first connecting member 20 is positioned in the axial direction by being inserted into an inner hole 70 of the sleeve member 18 covered by the inner rubber layer 48 from the upper opening and having the sleeve abutting protrusion 32 abutted against the top face of the sleeve member 18. Thus, by having the sleeve abutting protrusion 32 abutted against the sleeve member 18 in the axial direction, the insertion end of the first connecting member 20 into the sleeve member 18 is regulated in the axial direction. Meanwhile, the second connecting member 22 is inserted into the inner hole 70 of the sleeve member 18 from the lower opening until the bottom face reaches approximately the same position as the bottom face of the sleeve member 18. The inner rubber layer 48 bonded to the inner peripheral face of the sleeve member 18 has many concave grooves formed on the circumference to open on the inner peripheral face thereof and linearly extend in the axial direction, thereby reducing the friction force acting on the first and second connecting members 20, 22 when they are inserted into the inner hole 70.

In such a condition where the first connecting member 20 and the second connecting member 22 are assembled to the sleeve member 18, the bottom face, that is, the insertion end face, of the first connecting member 20 and the top face, that is, the insertion end face of the second connecting member 22 are facing each other at a given distance in the axial direction of the sleeve member 18. This allows a rod-end insertion space 72 to be formed between the first connecting member 20 and the second connecting member 22 on the inner peripheral side of the sleeve member 18. The rod abutting protrusion 44 of the second connecting member 22 protrudes out into the rod-end insertion space 72.

Further, the rod-end insertion space 72 is communicated with the outside (beyond the outer periphery of the outer tubular member 14) in the front-back direction via the inner window 24 of the sleeve member 18, the inner through window 66 of the inner rubber layer 48, the outer through window 68 of the outer rubber layer 50, and the outer window 46 of the outer tubular member 14. In short, in the present embodiment, the inner window 24 and the outer window 46 constituting the rod insertion holes are communicated with each other by the inner through window 66 and the outer through window 68 so that the rod-end insertion space 72 is communicated with the outside via the rod insertion holes. Also, the rod abutting protrusion 44 of the second connecting member 22 is located at a position opposite to the rod insertion holes in the front-back direction across the bolt hole 40.

Figure 7:
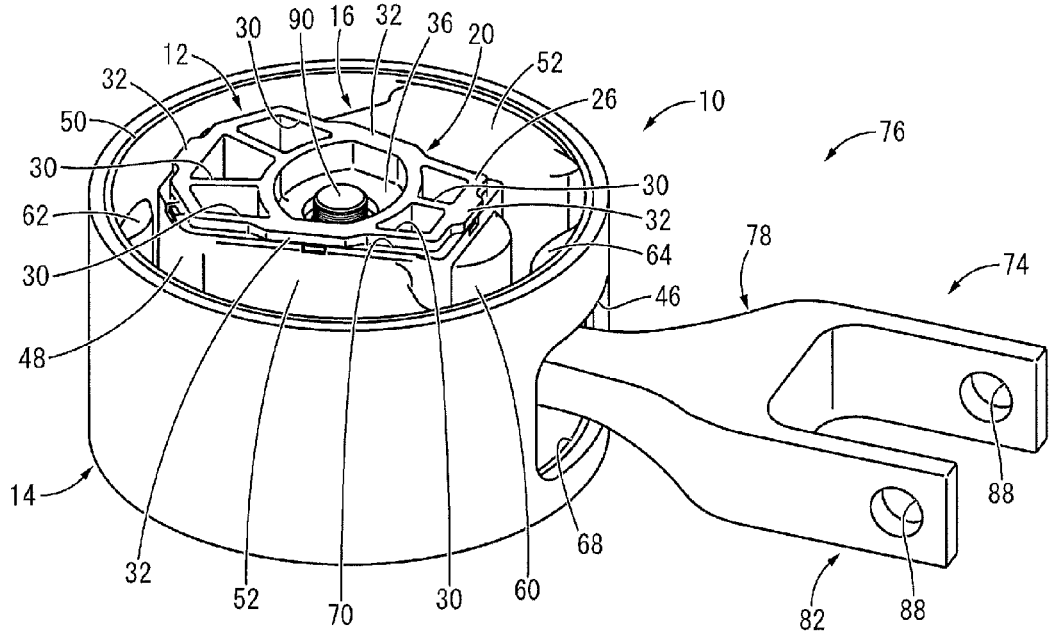
FIG. 7 is a perspective view of a torque rod provided with the tubular vibration-damping device of FIG. 1.
Figure 8:
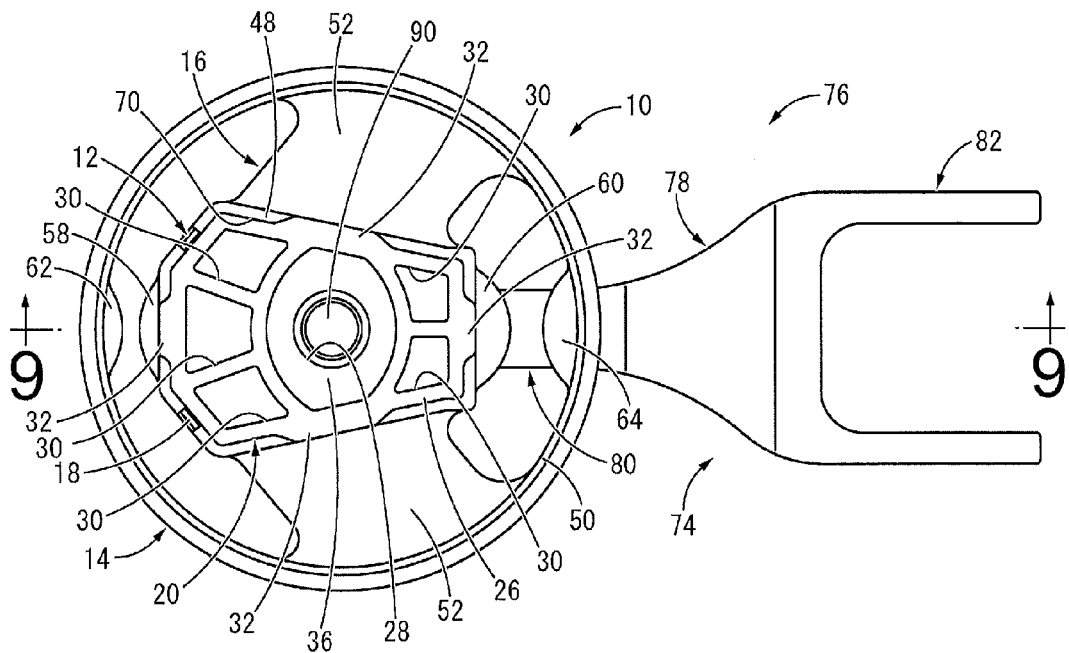
FIG. 8 is a plan view of the torque rod of FIG. 7.

The tubular vibration-damping device 10 with the structure described above, as shown in FIGS. 7 to 9, constitutes a torque rod 76 as a vibration-damping connecting rod by being mounted to one end of a rod main body 74.

The rod main body 74 is a high rigidity member formed with iron, aluminum alloy or the like in a longitudinal shape in the front-rear direction. In addition, in the middle of the rod main body 74, a tapered portion 78 is provided with its cross sectional area increasing gradually from one end to the other in the front-rear direction (from left to right in FIG. 8), and one end of the rod main body 74 is made to be a first mounting portion 80 extending with a near-constant rectangular cross section, while the other end is made to be a second mounting portion 82 in a fork shape.

Also, in the first mounting portion 80, a bolt hole 84 is formed therethrough in the up-down direction while an engaging convex portion 86 is integrally formed protruding upward around the upper opening of the bolt hole 84. The engaging convex portion 86 is made in a tapered form with its outer peripheral face gradually reducing the diameter upward.

Also, in the second mounting portion 82, a fastening hole 88 is formed penetrating therethrough in the left-right direction. With a bolt, not shown in the drawings, inserted through the fastening hole 88, a bracket member, not shown in the drawings, either, is mounted thereto.

Then, the first mounting portion 80 of the rod main body 74 is mounted to the side of the vehicular body (not shown), as a member to be vibration-damped, via the tubular vibration-damping device 10, while the second mounting portion 82 of the rod main body 74 is mounted to the side of a power unit (not shown), which is the vibration source, via a bracket member not shown in the drawings.

Under these circumstances, the first mounting portion 80 of the rod main body 74 is mounted to the inner shaft member 12 of the tubular vibration-damping device 10. That is, the first mounting portion 80 of the rod main body 74 is inserted into the rod-end insertion space 72 of the inner shaft member 12 via the inner window 24 and the outer window 46 as rod insertion holes of the tubular vibration-damping device 10. Then, the rod main body 74 is fixed between the first and second connecting members 20, 22 by having a fixing bolt 90, as a fastening member, which is inserted into the bolt hole 40 of the second connecting member 22 and the bolt hole 84 of the first mounting portion 80 from below, screwed and tightened in the nut 34 of the first connecting member 20.

Further, a fastening force in the axial direction exerted by fastening the fixing bolt 90 into the nut 34 is applied to the first and second connecting members 20, 22 in the direction of getting closer to each other. This allows the first and second connecting members 20, 22 inserted into the sleeve member 18 in a state of being allowed to move in the axial direction to get closer to each other and overlapped with the first mounting portion 80 of the rod main body 74, respectively in an abutted manner.

Manufacturing methods of the torque rod 76 are described below including the manufacturing method of the tubular vibration-damping device 10.

First, by vulcanization-molding the main rubber elastic body 16 using a metal mold with the sleeve member 18 and the outer tubular member 14 preset therein, the integrally vulcanization molded component 54 of the main rubber elastic body 16 is formed. This completes the step of rubber molding.

Next, the first connecting member 20 is inserted into the inner hole 70 from the upper opening of the sleeve member 18, while the second connecting member 22 is inserted into the inner hole 70 from the lower opening of the sleeve member 18 so as to assemble the first connecting member 20 and the second connecting member 22 temporarily in a movable condition in the axial direction relative to the sleeve member 18. This completes the step of inner temporary assembly to form the tubular vibration-damping device 10. In the present embodiment, since the bottom portion of the first connecting member 20 and the top portion of the second connecting member 22 are made in a tapered form that gradually reduces in size toward each insertion end, the insertion of the first and second connecting members 20, 22 into the sleeve member 18 can be performed more easily.

Figure 10:
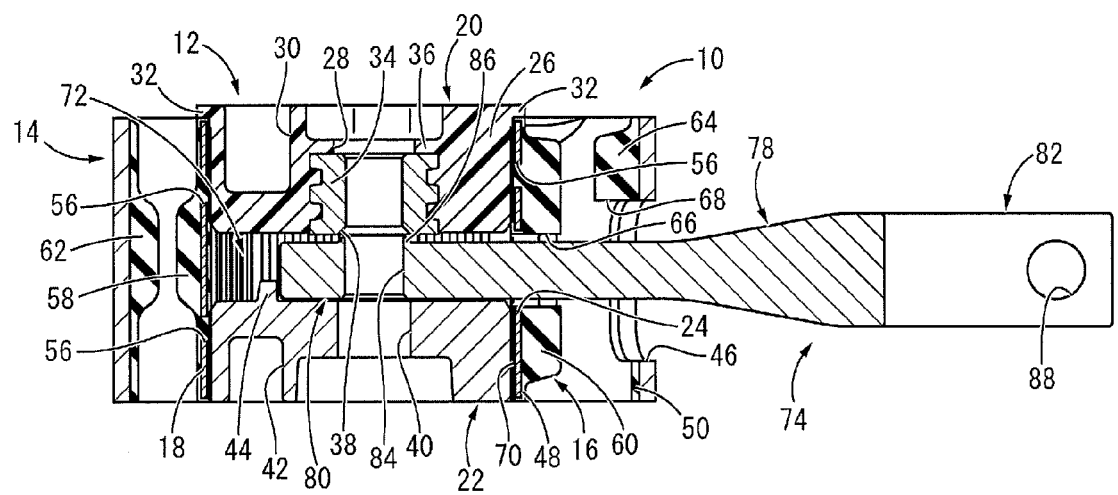
FIG. 10 is a vertical cross sectional view suitable for explaining a manufacturing step of the torque rod of FIG. 7.

Next, one end of the rod main body 74 prepared in advance is inserted into the rod-end insertion space 72 of the inner shaft member 12 from the outer window 46 of the outer tubular member 14 in the tubular vibration-damping device 10 via the inner window 24 of the sleeve member 18. This completes the step of rod insertion (see FIG. 10). FIG. 10 shows the rod main body 74 in a state of being inserted into a single unit of the tubular vibration-damping device 10, but for example, after pressing the outer tubular member 14 of the tubular vibration-damping device 10 into a holder such as a suspension member on the vehicular body, the rod main body 74 can be inserted into the rod-end insertion space 72 from the opening on the holder peripheral wall communicated with the outer window 46 of the outer tubular member 14.

In the present embodiment, the insertion end of the rod main body 74 is regulated by having the end face thereof abutted against the rod abutting protrusion 44 of the second connecting member 22 so that the amount of insertion of the rod main body 74 into the rod-end insertion space 72 is properly set. However, the rod main body 74 does not have to be positioned precisely at the location of being mounted to the inner shaft member 12 due to abutment against the rod abutting protrusion 44, but it can be positioned to the extent that allows the fixing bolt 90 to be inserted into the bolt holes 40, 84 in the rod fixing step described later. Also, as shown in FIG. 9, once the rod fixing step described later is completed, the rod main body 74 is separated from the rod abutting protrusion 44.

Further, in the present embodiment, the distance between the overlapped faces of the first connecting member 20 and the second connecting member 22 temporarily assembled to the sleeve member 18 in the inner temporary assembly step is made larger than the maximum thickness dimension of one end of the rod main body 74 to be inserted into the rod-end insertion space 72, that is, the distance from the bottom face of the rod main body 74 to the protrusion tip of the engaging convex portion 86. This allows one end of the rod main body 74 to be inserted into the rod-end insertion space 72 with a gap left against at least one of the first and second connecting members 20, 22, as shown in FIG. 10.

Figure 9:
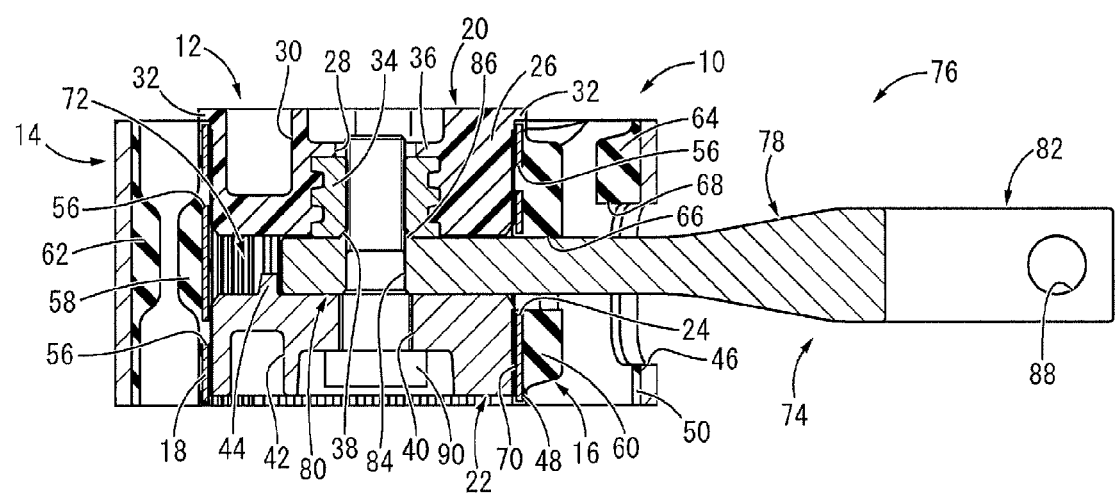
FIG. 9 is a cross sectional view taken along line 9-9 of FIG. 8

Next, as shown in FIG. 9, the first and second connecting members 20, 22 and the rod main body 74 are fixed to each other by having the fixing bolt 90 inserted into the bolt hole 40 of the second connecting member 22 and into the bolt hole 84 of the rod main body 74 from below and by screwing the fixing bolt 90 into the nut 34 of the first connecting member 20. The second connecting member 22 is further inserted into the inner hole 70 of the sleeve member 18 by the fastening force of fastening the fixing bolt 90 to the nut 34 exerted against the first and second connecting members 20, 22 in the direction of getting closer to each other resulting in positioning thereof in relative proximity. This allows the first and second connecting members 20, 22 to be abutted on the rod main body 74 from top and bottom sides, respectively, so that the rod main body 74 is held between the first and second connecting members 20, 22. This completes the step of rod fixing to form the torque rod 76, which is the rod main body 74 with the tubular vibration-damping device 10 mounted thereto.

Since the outer peripheral face of the engaging convex portion 86 in the rod main body 74 and the inner peripheral face of the engaging concave portion 38 in the first connecting member 20 are made in tapered forms nearly corresponding to each other, the guiding action of these tapered faces guides the rod main body 74 to a given position relative to the first connecting member 20 in the axis-perpendicular direction. Further, the rod main body 74 is held at a given position relative to the inner shaft member 12 by having the engaging convex portion 86 fitted in the engaging concave portion 38 provided in the nut 34 of the first connecting member 20 to be engaged with each other in the axis-perpendicular direction. In addition, since the bottom face of the nut 34 protrudes downward beyond the bottom face of the main body portion 26, the rod main body 74 is held between the nut 34 and the second connecting member 22, both made with metal, thus preventing the main body portion 26 made of resin from getting damaged by abutting against the rod main body 74.

Further, in the present embodiment, since the sleeve member 18 is made in an approximate shape of a polygonal cylinder, while the outer peripheral face of the first connecting member 20 is made in an approximate shape of a polygonal cylinder corresponding to the inner peripheral face configuration of the sleeve member 18, the first connecting member 20 is prevented from rotating relative to the sleeve member 18. Therefore, by having the fixing bolt 90 tightened while the sleeve member 18 is supported by a jig or the like, the reaction force of the fastening torque can be prevented from acting on the main rubber elastic body 16. It is also possible to prevent torque reaction force from being exerted on the main rubber elastic body 16 by fastening the fixing bolt 90 while the first connecting member 20 is unrotatably supported by a jig.

Moreover, in this embodiment, in a state where the rod main body 74 is mounted to the inner shaft member 12, the top face of the rod main body 74 is abutted against the upper edge of the inner window 24 of the sleeve member 18 via the inner rubber layer 48 so that the rod main body 74 is restricted from moving upward. Meanwhile, the bottom face of the rod main body 74 is separated from the lower edge of the inner window 24 of the sleeve member 18, but downward displacement of the rod main body 74 is restricted by having the sleeve abutting protrusion 32 of the first connecting member 20 overlapped in abutment with the top face of the sleeve member 18.

The torque rod 76 with the structure described above has the outer tubular member 14 mounted to the vehicular body and the inner shaft member 12 mounted to the power unit, which is the vibration source, via the rod main body 74, so that the outer tubular member 14 is never displaced relative to the vehicular body even at the time of vibration input in the axis-perpendicular direction. Therefore, by providing an installation space just for the outer tubular member 14 without providing any space around it, interference thereof with other members to be mounted to the vehicular body can be prevented while linear vibration-damping characteristics can be obtained in response to a large load input.

In addition, since there is no need to provide a tubular portion for pressing the outer tubular member 14 with a large diameter into the rod main body 74, which makes the rod main body 74 lighter, it becomes possible to set the resonance frequency higher in the resonance system including the rod main body 74 as the mass, thus preventing deterioration of vibration conditions within a practical range due to resonance in said resonance system.

Also, the tubular vibration-damping device 10 is structured such that the inner shaft member 12 has the first and second connecting members 20, 22 inserted into the sleeve member 18 from each respective opening where the sleeve member 18 and the outer tubular member 14 extend continuously all along the length without being divided in the axial direction. Therefore, by having the bonding face of the main rubber elastic body 16 continuously secured large enough in the inner shaft member 12 and the outer tubular member 14, the rubber volume of the main rubber elastic body 16 in the axial direction is secured large enough to improve the degree of tuning freedom of the vibration-damping characteristics and to enhance the durability. In addition, the main rubber elastic body 16 can be bonded firmly to the inner shaft member 12 and the outer tubular member 14.

Further, the first and second connecting members 20, 22 are inserted into the sleeve member 18 without being directly bonded to the main rubber elastic body 16 in a state of temporary assembly with some movements allowed in the axial direction. Therefore, in the rod fixing step where the rod main body 74 is mounted, the relative displacement of the first and second connecting members 20, 22 to get closer to each other due to the fastening force of the fixing bolt 90 and the nut 34 is allowed without being limited by the elasticity of the main rubber elastic body 16. Therefore, the first and second connecting members 20, 22 can be abutted against the rod main body 74 with no need for a significant force to tighten the fixing bolt 90 against the nut 34, while any generation of strain in the main rubber elastic body 16 is avoided due to the displacement of the first and second connecting members 20, 22.

Moreover, since the first and second connecting members 20, 22 are abutted on the first mounting portion 80 of the rod main body 74 and the first mounting portion 80 is held between the first and second connecting members 20, 22, any rattling of the rod main body 74 against the first and second connecting members 20, 22, or the like is prevented to keep the rod main body 74 in a stably mounted condition. Especially since the first and second connecting members 20, 22 are allowed to move relative to the sleeve member 18 in the axial direction, the first and second connecting members 20, 22 can be abutted on the rod main body 74 in a stable manner without precisely setting the dimension of the rod-end insertion space 72 in the axial direction.

Also, the engaging concave portion 38 formed in the nut 34 of the first connecting member 20 is engaged with the engaging convex portion 86 of the rod main body 74 in a concave-convex manner to lock the engaging concave portion 38 and the engaging convex portion 86 to each other in the axis-perpendicular direction of the inner shaft member 12. Therefore, the rod main body 74 is positioned relative to the first connecting member 20 in the axis-perpendicular direction to be held, so that the rod main body 74 is prevented from slipping out of the rod-end insertion space 72 in a favorable manner, while the shear force exerted on the fixing bolt 90 by an input in the axis-perpendicular direction is reduced to enhance the durability thereof.

Further, since the outer tubular member 14 is integrally made without any division, the press-in margin against a holder, not shown, is secured large enough in the axial direction, so that a larger anti-slipoff force of the outer tubular member 14 against the holder can be obtained, while any tilting of the outer tubular member 14 against the holder is efficiently restricted to achieve a stably mounted condition. In addition, it is sufficient to press a single outer tubular member 14 into the holder, which makes it easier to mount the device to the vehicular body.

Figure 11:
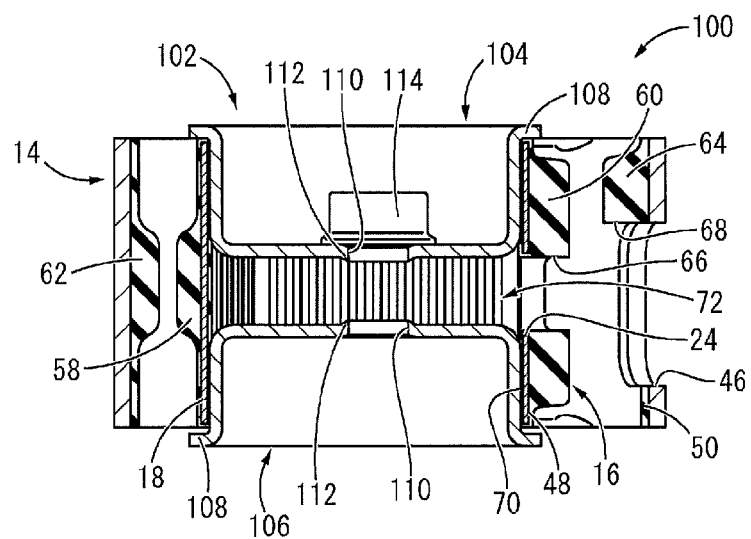
FIG. 11 is a vertical cross sectional view of a tubular vibration-damping device as a second embodiment of the present invention.

FIG. 11 shows a tubular vibration-damping device 100 for a vibration-damping connecting rod as a second embodiment of the present invention. The tubular vibration-damping device 100 has a structure where an inner shaft member 102 and the outer tubular member 14 are elastically connected by the main rubber elastic body 16. In the following paragraphs, detailed descriptions of substantially the same members and parts as those of the first embodiment are omitted by assigning the same numerals to the equivalent components in the drawings.

More specifically, the inner shaft member 102 has a structure where a first connecting member 104 and a second connecting member 106 are inserted into the sleeve member 18 in an approximate shape of a polygonal cylinder from each respective opening. The first connecting member 104 is in an approximate shape of a bottomed polygonal cylinder having an outer peripheral configuration corresponding to the inner peripheral configuration of the sleeve member 18, and a sleeve abutting protrusion 108 as an insertion-position regulating part in a flange shape is integrally formed with the top edge of the peripheral wall thereof. Further, on the bottom wall of the first connecting member 104, a bolt hole 110 is formed penetrating through the center thereof in the up-down direction, while an engaging convex portion 112 is formed as a fitting portion to protrude downward around the bolt hole 110. Moreover, a nut 114 is bonded on the top face of the bottom wall of the first connecting member 104 by means such as welding, and the screw hole of the nut 114 is communicated with the bolt hole 110.

The second connecting member 106 has approximately the same structure as that of the first connecting member 104 turned upside down without the nut 114. In the present embodiment, the second connecting member 106 is also provided with the same sleeve abutting protrusion 108 and the engaging convex portion 112 as those of the first connecting member 104.

The first and second connecting members 104, 106 of the present embodiment can be obtained by a simple and inexpensive means by press-working a metal plate, for example. Also, the engaging convex portion 112 formed on the bottom walls of the first and second connecting members 104, 106 can easily be formed by bending the peripheral portion of the bolt hole 110 on the bottom walls.

Then, the first connecting member 104 is inserted into the inner hole 70 of the sleeve member 18 covered by the inner rubber layer 48 from the upper opening, while the second connecting member 106 is inserted into the same from the lower opening. The first and second connecting members 104, 106 are assembled to the sleeve member 18 in a movable manner in the axial direction.

In addition, the bottom walls of the first and second connecting members 104, 106 are separated from each other in the up-down direction, between which is formed a rod-end insertion space 72. In the present embodiment, the sleeve abutting protrusion 108 of the first connecting member 104 is abutted against the top face of the sleeve member 18 via the inner rubber layer 48, while the sleeve abutting protrusion 108 of the second connecting member 106 is separated downward from the bottom face of the sleeve member 18. However, since the first and second connecting members 104, 106 are temporarily assembled to the sleeve member 18 in a movable manner, each of the first and second connecting members 104, 106 can be inserted into the sleeve member 18 until the sleeve abutting protrusions are abutted against the end face of the sleeve member 18 in the axial direction.

According to the tubular vibration-damping device 100 with the structure of the present embodiment, since the first connecting member 104 and the second connecting member 106 are formed with a press-mold metal with the same configuration, those products can be manufactured with excellent mass-productivity at a low cost. In addition, by forming the connecting members with a thin press-mold metal, weight reduction is achieved with the first and second connecting members 104, 106.

Figure 12:
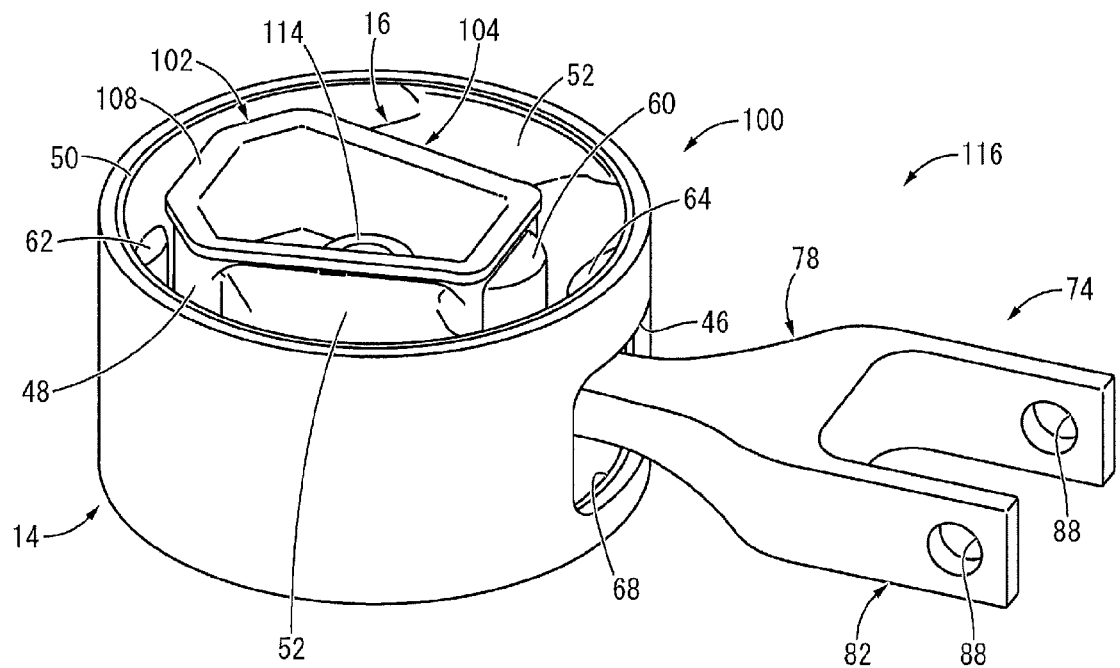
FIG. 12 is a perspective view of a torque rod provided with the tubular vibration-damping device of FIG. 11.

The tubular vibration-damping device 100 of the present embodiment with the structure described above, as shown in FIGS. 12 and 13, are mounted to one end of the rod main body 74 to constitute a torque rod 116 as a vibration-damping connecting rod. That is, one end of the rod main body 74 is inserted into the rod-end insertion space 72 of the inner shaft member 102 via the inner and outer windows 24, 46 of the tubular vibration-damping device 100. Then, the first and second connecting members 104, 106 and the rod main body 74 are fixed to each other by having the fixing bolt 90 that is inserted into the bolt holes 110, 110 of the first and second connecting members 104, 106 and the bolt hole 84 of the rod main body 74 screwed into the nut 114 of the first connecting member 104 and tightened. Meanwhile, in the rod main body 74 of the present embodiment, an engaging concave portion 118 is formed around each of the upper and lower openings of the bolt hole 84.

Figure 13:
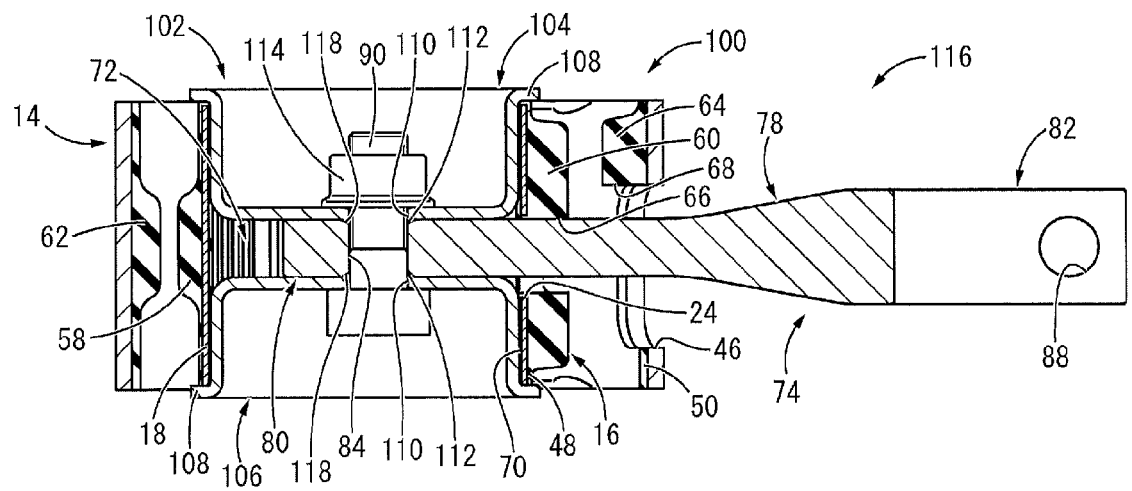
FIG. 13 is a vertical cross sectional view of the torque rod of FIG. 12.
Figure 14:
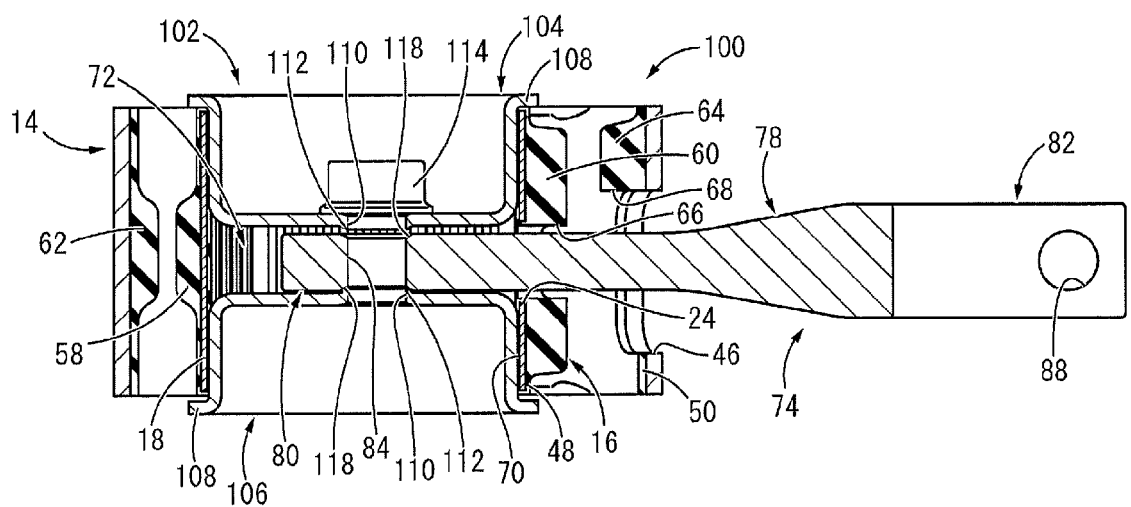
FIG. 14 is a vertical cross sectional view suitable for explaining a manufacturing step of the torque rod of FIG. 12.

Further, in the present embodiment as is the case with the first embodiment, the rod main body 74 is inserted into the rod-end insertion space 72 with a gap left against the first connecting member 104 (see FIG. 14). Then, the second connecting member 106 is moved relative to the sleeve member 18 in the insertion direction by having the fixing bolt 90 tightened against the nut 114, and the first and second connecting members 104, 106 are overlapped in abutment with each of the upper and lower faces of the rod main body 74 as shown in FIG. 13. Moreover, the rod main body 74 is positioned against the inner shaft member 102 in the axis-perpendicular direction by having the engaging convex portions 112, 112 of the first and second connecting members 104, 106 fitted in each of the engaging concave portions 118, 118 opening to the upper and lower faces of the rod main body 74, and the outer peripheral face of the engaging convex portion 112 locked with the inner peripheral face of the engaging concave portion 118 in the axis-perpendicular direction.

According to the torque rod 116 related to the present embodiment, since the first and second connecting members 104, 106 to be fixed to the rod main body 74 are made lighter by being formed with a press-mold metal, any resonance phenomenon of the resonance system including the rod main body 74 and the first and second connecting members 104, 106 as the mass can be prevented from exerting an adverse effect on the vibration condition within a practical frequency range more effectively.

Embodiments of the present invention have been described in detail above, but the present invention is not limited by those specific descriptions. For example, the sleeve member is not particularly limited to a polygonal cylinder shape but can be in a circular cylinder shape, for example, and more preferably in a tubular shape that changes its cross-sectional configuration in the circumferential direction so as to prevent the rotation of the first and second connecting members relative to the sleeve member.

Also, the first embodiment exemplifies the main body portion 26 made of resin and the nut 34 made of metal inserted therein being integrally formed, but for example, the main body portion and the nut can be integrally formed using metal.

Also, the aforementioned embodiment shows an example where only the second connecting member 22 is moved relative to the sleeve member 18 in the axial direction by means of screwing the fixing bolt 90 into the nut 34, but the first and second connecting members 20, 22 can each be moved relative to the sleeve member 18 in the axial direction to get closer to each other. In addition, either of the first and second connecting members 20, 22 may be mounted in an unmovable manner in the axial direction against the sleeve member 18.

Besides, although the aforementioned embodiment exemplifies a structure using the fixing bolt 90 and the nut 34 as fastening members, the fixing means between the first and second connecting members and the rod main body is not limited to the bolt fixing structure exemplified above, but it is also possible to fix the first and second connecting members to the rod main body by riveting (pin crimping structure), for example.

Also, in the aforementioned embodiment, by making the distance between the insertion end faces of the first connecting member 20 and the second connecting member 22 larger than the dimension of the first mounting portion 80 of the rod main body 74 in the same direction in advance, the rod main body 74 can easily be inserted into the rod-end insertion space 72 with a gap left in between, but this is just an example and the present invention is not limited to such a configuration.

To be more specific, first of all, in the inner temporary assembly step, for example, the first and second connecting members 20, 22 are inserted into the sleeve member 18 with the distance between the insertion end faces of the first connecting member 20 and the second connecting member 22 set in advance at no larger than the dimension of the first mounting portion 80 of the rod main body 74 in the same direction. Next, in the rod insertion step, an insertion component force oriented outward in the axial direction is applied to each of the first and second connecting members 20, 22 by inserting the rod main body 74 into the rod-end insertion space 72. Then, the first mounting portion 80 of the rod main body 74 is inserted into the rod-end insertion space 72 while the gap between the insertion end faces of the first connecting member 20 and the second connecting member 22 is spread open. Thereafter in the rod fixing step, the first and second connecting members 20, 22 are fixed to the rod main body 74 with the fixing bolt 90, while the rod main body 74 is mounted to the inner shaft member 12 by having the first and second connecting members 20, 22 displaced to get closer to each other and abutted on the rod main body 74. Thus, even when the distance between the insertion end faces of the first and second connecting members 20, 22 is made no larger than the dimension of the rod main body 74 in the same direction, the rod main body 74 can be inserted into the rod-end insertion space 72.

Also, the present invention is applicable to vibration-damping connecting rods other than the torque rod as well as tubular vibration-damping devices used therefor.

What is claimed is:

1. A tubular vibration-damping device for a vibration-damping connecting rod having a rod main body, comprising:
　an inner shaft member configured to be mounted on the rod main body;
　an outer tubular member; and
　a main rubber elastic body elastically connecting the inner shaft member and the outer tubular member, wherein
　the inner shaft member comprises a sleeve member, a first connecting member and a second connecting member, the first and second connecting members being overlapped with each other in an axial direction and being inserted into the sleeve member,
　the main rubber elastic body is bonded to an outer peripheral face of the sleeve member,
　overlapping faces of the first and second connecting members in the axial direction are separated from each other so as to provide therebetween a rod-end insertion space,
　the rod-end insertion space is communicated with an outside via a rod insertion hole that opens through peripheral walls of the sleeve member and the outer tubular member, and
　the first and second connecting members are configured to be fixed on one end of the rod main body inserted into the rod-end insertion space via the rod insertion hole by a fastening member so that the first and second connecting members are abutted on the rod main body by the fastening member.

2. The tubular vibration-damping device for the vibration-damping connecting rod according to claim 1, wherein at least one of the first and second connecting members is provided with a fitting portion for being engaged with the rod main body in a concave-convex manner.

3. The tubular vibration-damping device for the vibration-damping connecting rod according to claim 1, wherein at least one of the first and second connecting members is provided with an insertion-position regulating part that regulates a position of an insertion end relative to the sleeve member.

4. The tubular vibration-damping device for the vibration-damping connecting rod according to claim 1, wherein at least one of the first and second connecting members is provided with a rod-position regulating part that regulates a position of an insertion end of the rod main body relative to the rod-end insertion space.

5. The tubular vibration-damping device for the vibration-damping connecting rod according to claim 1, wherein one of the first and second connecting members is provided with a nut integrally, while the fastening member comprises the nut and a fixing bolt configured to be inserted into a bolt hole that penetrates an other of the first and second connecting members and the rod main body, and by having the fixing bolt screwed into the nut, the first and second connecting members and the rod main body are fixed to each other, with the first and second connecting members being abutted on the rod main body by tightening the fixing bolt with said nut.

6. A vibration-damping connecting rod, comprising:
a rod main body; and
a tubular vibration-damping device comprising:
an inner shaft member configured to be mounted on the rod main body;
an outer tubular member; and
a main rubber elastic body elastically connecting the inner shaft member and the outer tubular member, wherein
the inner shaft member comprises a sleeve member, a first connecting member and a second connecting member, the first and second connecting members being overlapped with each other in an axial direction and being inserted into the sleeve member,
the main rubber elastic body is bonded to an outer peripheral face of the sleeve member,
overlapping faces of the first and second connecting members in the axial direction are separated from each other so as to provide therebetween a rod-end insertion space,
the rod-end insertion space is communicated with an outside via a rod insertion hole that opens through peripheral walls of the sleeve member and the outer tubular member, and
the first and second connecting members are configured to be fixed on one end of the rod main body inserted into the rod-end insertion space via the rod insertion hole by a fastening member so that the first and second connecting members are abutted on the rod main body by the fastening member, wherein
the one end of the rod main body is inserted into the rod-end insertion space via the rod insertion hole, and is fixed between the overlapping faces of the first and second connecting members.

7. A method of manufacturing a vibration-damping connecting rod comprising:
a rubber molding step for vulcanization-molding a main rubber elastic body between a sleeve member and an outer tubular member for elastically connecting the sleeve member and the outer tubular member by the main rubber elastic body;
an inner temporary assembly step for inserting a first connecting member and a second connecting member into the sleeve member to be overlapped with each other in an axial direction, and for assembling at least one of the first and second connecting members to the sleeve member in a movable manner in the axial direction;
a rod insertion step for inserting one end of a rod main body into a rod-end insertion space formed between the overlapping faces in the axial direction of the first and second connecting members via a rod insertion hole formed on peripheral walls of the sleeve member and the outer tubular member; and
a rod fixing step for fixing the first and second connecting members to the one end of the rod main body by a fastening member with at least one of the first and second connecting members being moved in the axial direction relative to the sleeve member by a fastening force of the fastening member so that the first and second connecting members are abutted on the rod main body.

8. The method of manufacturing a vibration-damping connecting rod according to claim 7, wherein
in the inner temporarily assembly step, a distance between the overlapping faces of the first and second connecting members is made larger than a size of the one end of the rod main body,
in the rod insertion step, the one end of the rod main body is inserted into the rod-end insertion space with a gap left against at least one of the overlapping faces of the first and second connecting members, and
in the rod fixing step, the first and second connecting members are displaced to get closer to each other so as to be abutted on the rod main body.

9. The method of manufacturing a vibration-damping connecting rod according to claim 7, wherein in the rod insertion step, the one end of the rod main body is inserted into the rod-end insertion space while at least one of the first and second connecting members is moved outward in the axial direction of the sleeve member by a component force generated upon insertion of the one end of the rod main body into the rod-end insertion space.

* * * * *